(12) United States Patent
Stevenson

(10) Patent No.: US 7,283,425 B1
(45) Date of Patent: Oct. 16, 2007

(54) APPARATUS FOR MEASURING FLOW NOISE OF WATER OVER A HYDROPHONE

(75) Inventor: Willard Stevenson, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/512,538

(22) Filed: Aug. 30, 2006

(51) Int. Cl.
G01M 3/24 (2006.01)
H04R 29/00 (2006.01)

(52) U.S. Cl. .................... 367/140; 73/40.5 A
(58) Field of Classification Search ............ 73/40.5 A, 73/649; 367/140
See application file for complete search history.

(56) References Cited

U.S. PATENT DOCUMENTS 5,339,287 A * 8/1994 Bauer ..................... 367/140
5,477,506 A * 12/1995 Allen ....................... 367/140
7,248,703 B1 * 7/2007 Heine et al. ............. 181/296
2003/0110854 A1 * 6/2003 Nakada et al. .......... 73/204.22
2003/0204338 A1 * 10/2003 Martinek ................. 702/51

* cited by examiner

*Primary Examiner*—Ian J. Lobo
(74) *Attorney, Agent, or Firm*—Peter A. Lipovsky; Allan Y. Lee; J. Eric Anderson

(57) ABSTRACT

A water flow noise measuring apparatus comprising: a frame; a beam comprising a distal and a proximal end, where the proximal end is pivotably coupled to the frame; a hydrophone capable of detecting water flow noise and generating water flow noise data, where the hydrophone is coupled to the beam at a predetermined distance from the proximal end; an angular displacement sensor capable of detecting the angular displacement of the beam with respect to the frame and generating a displacement detection signal, where the angular displacement sensor is operably coupled to the beam and the frame; and a computer capable of receiving the water flow noise data and the displacement detection signal, determining the tangential velocity of the hydrophone from the displacement detection signal, and generating an output signal representing the water flow noise data as a function of the tangential velocity.

16 Claims, 14 Drawing Sheets

APPARATUS FOR MEASURING FLOW NOISE OF WATER OVER A HYDROPHONE

FEDERALLY-SPONSORED RESEARCH AND DEVELOPMENT

This apparatus for measuring flow noise of water over a hydrophone was developed with federal funds and is assigned to the United States Government. Licensing and technical inquiries may be directed to the Office of Patent Counsel, Space and Naval Warfare Systems Center, San Diego, Code 20012, San Diego, Calif., 92152; telephone (619) 553-3001, facsimile (619) 553-3821. Reference Navy Case No. 96920.

BACKGROUND OF THE INVENTION

Current practices of measuring the flow noise of water over a hydrophone (water-flow noise) involve allowing the hydrophone to free-fall through water or pulling the hydrophone through water with a boat. Allowing the hydrophone to free-fall through water limits the speed at which noise measurements may be taken to the terminal velocity of the hydrophone. Also, when towing the hydrophone through water with a boat, noise from the boat and/or the towlines adversely affects the water-flow noise measurement.

A need exists for an apparatus and method, which produces a reduced amount of unwanted noise as compared to current practices and allows for the measurement of the water-flow noise at a variety of flow speeds.

BRIEF DESCRIPTION OF THE DRAWINGS

Throughout the several views, like elements are referenced using like references.

DETAILED DESCRIPTION OF EMBODIMENTS

Figure 1A:
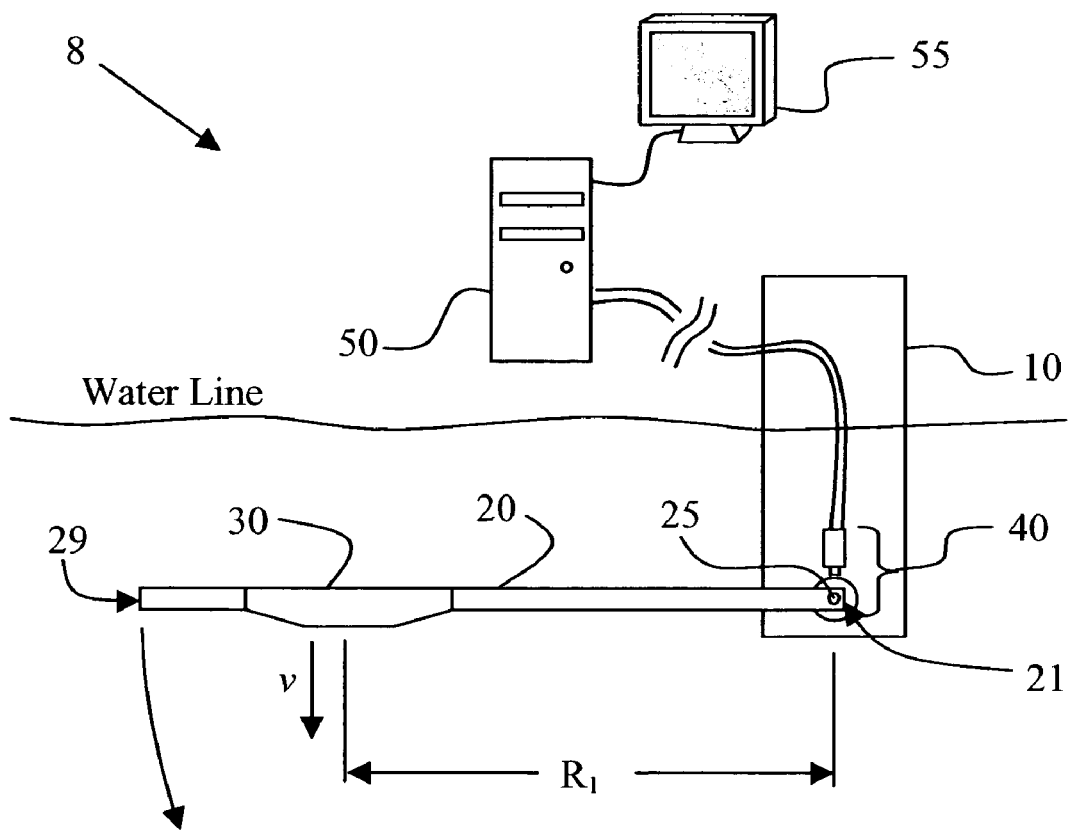
FIG. 1a is a front view of an embodiment of an apparatus for measuring water-flow noise.

FIG. 1a illustrates a water-flow noise measuring apparatus 8 comprising a frame 10, a beam 20 with a distal end 29 and a proximal end 21, a hydrophone 30, an angular displacement sensor 40, and a computer 50. Pivotably coupling the proximal end 21 to the frame 10 at a pivotal axis 25, and then allowing the distal end 29, to which the hydrophone 30 is coupled, to travel in an arc through water allows the water-flow noise to be measured as a function of the flow rate of the water over the hydrophone 30. The flow rate of water over the hydrophone 30 may be equated with the tangential velocity v of the hydrophone 30 as beam 20 pivots through the water. The tangential velocity y of the hydrophone 30 may be calculated according to the equation:

$$v = \omega * R_1$$

Where ω is the angular speed (rad/s) of beam 20, and $R_1$ is the distance between the hydrophone 30 and the pivotal axis 25.

The frame 10 may be a structure constructed of any material capable of supporting the weight of beam 20 as transferred to frame 10 via pivotal axis 25. Frame 10 may also support the angular displacement sensor 40. The frame 10 may be capable of floating on an air-water interface, or may be secured to land in such a way as to allow beam 20 to pivot through water. A few example embodiments of frame 10 include a pier, a boat, a buoy, or a structure that may be mounted on a pier or boat such that beam 20 may pivot through water.

Figure 1B:
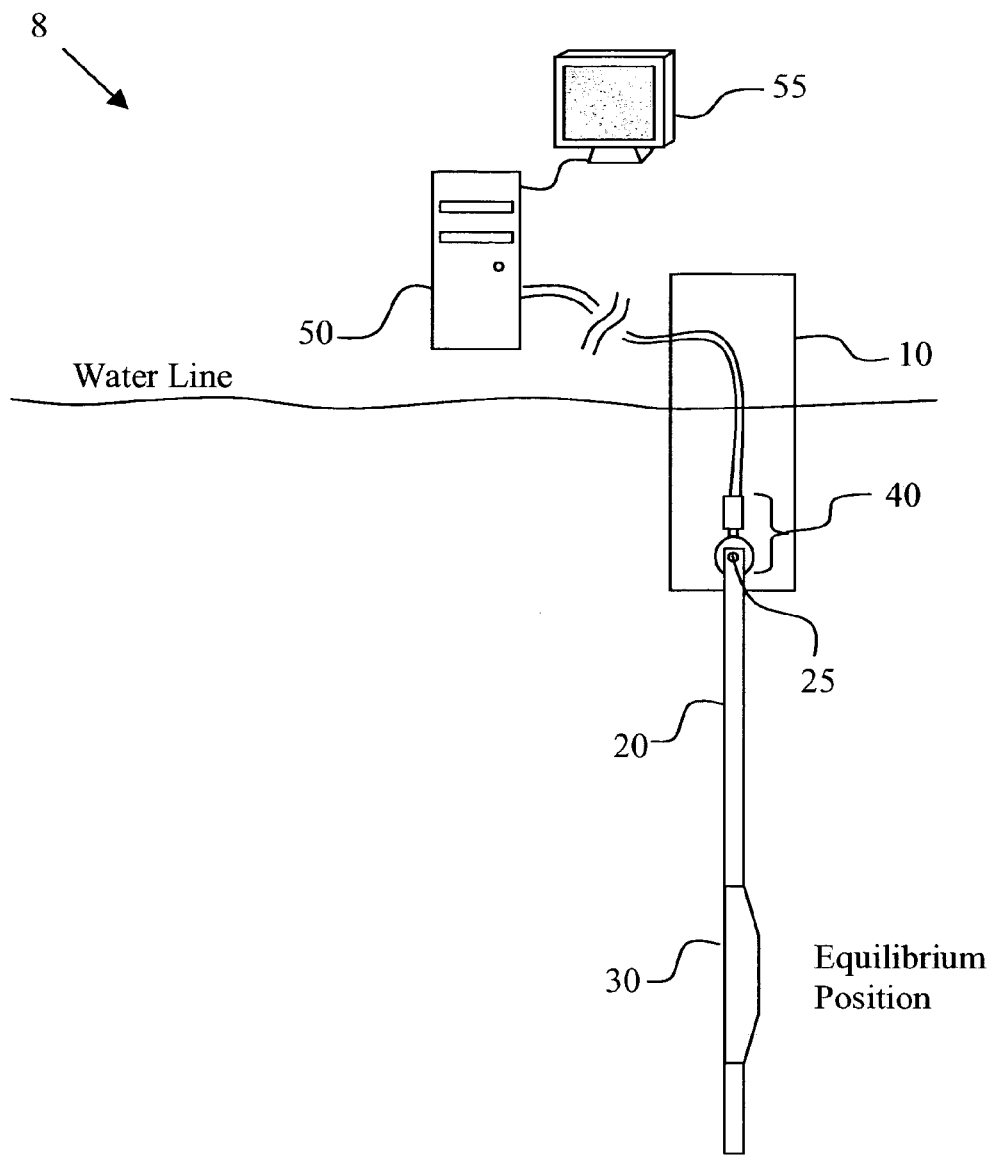
FIG. 1b is a front view of an embodiment of an apparatus for measuring water-flow noise in an equilibrium position.
Figure 11:
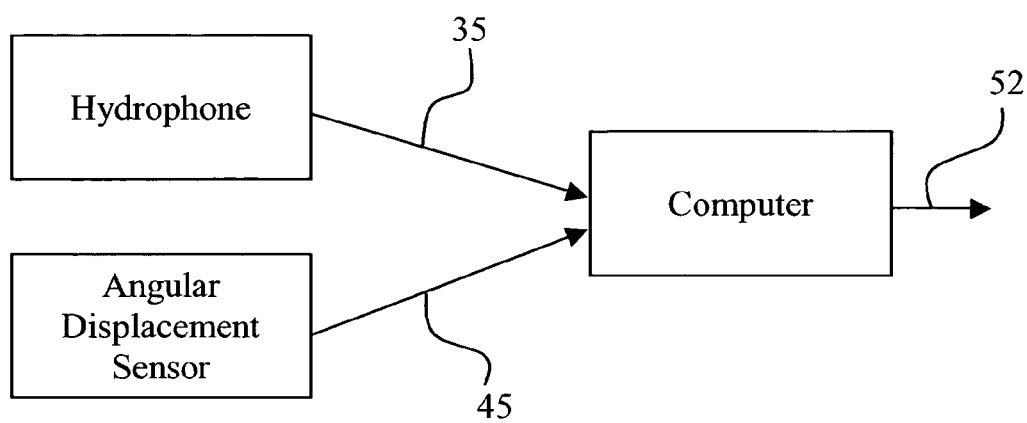
FIG. 11 is a block diagram of an apparatus for measuring water-flow noise.

The hydrophone 30 may be mounted to beam 20 at a predetermined distance $R_1$ from proximal end 21 of beam 20. The hydrophone 30 is capable of detecting the noise generated by water flowing over the hydrophone 30 as beam 20 pivots through the water and then generating water-flow noise data 35, as shown in FIG. 11, which is then received by a computer 50. In one embodiment, the distal end 29 of beam 20 may be allowed to drop from a position in which beam 20 is parallel to the water line until beam 20 comes to rest at an equilibrium position, as shown in FIG. 1b. During such a drop, the distal end 29 of beam 20 will start from zero tangential velocity, reach a maximum free-fall tangential velocity, and slow to zero tangential velocity as it comes to rest at an equilibrium position.

Figure 2:
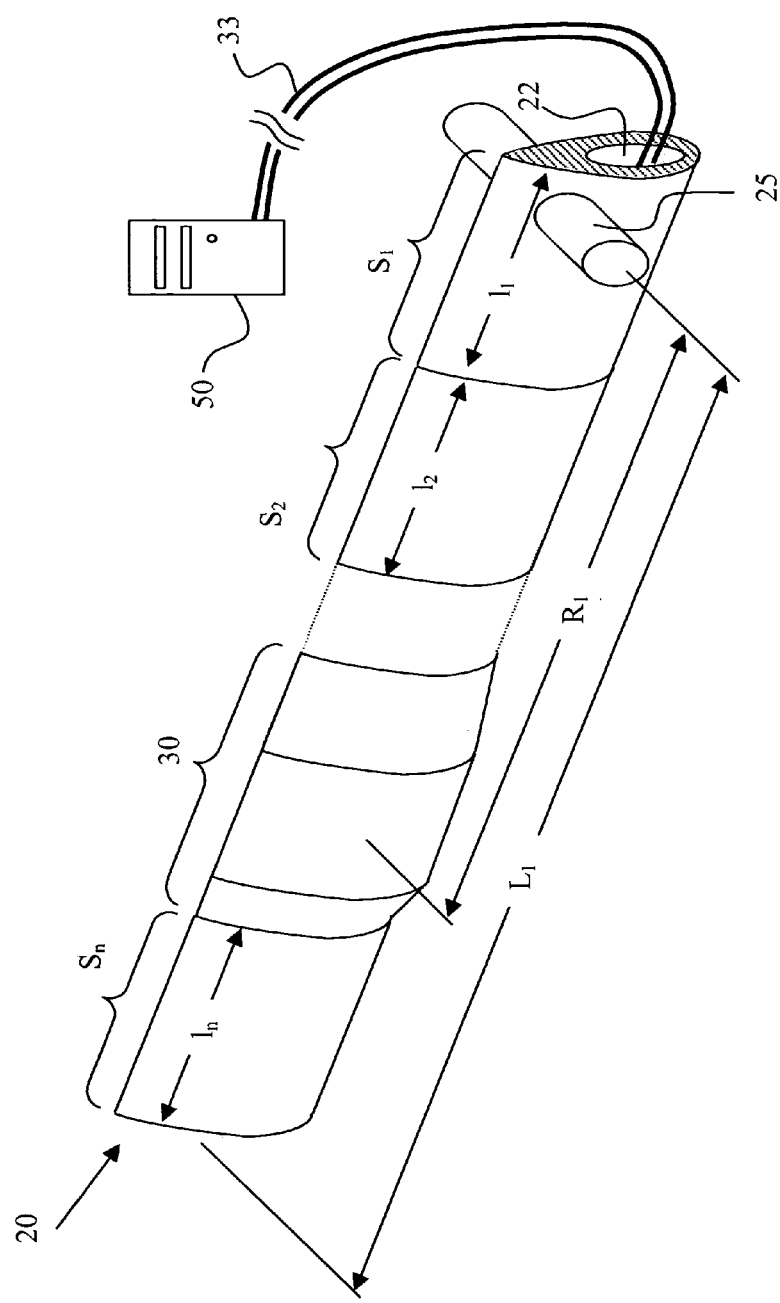
FIG. 2 is a sectional, perspective view of an embodiment of a section of an apparatus for measuring water-flow noise.
Figure 3:
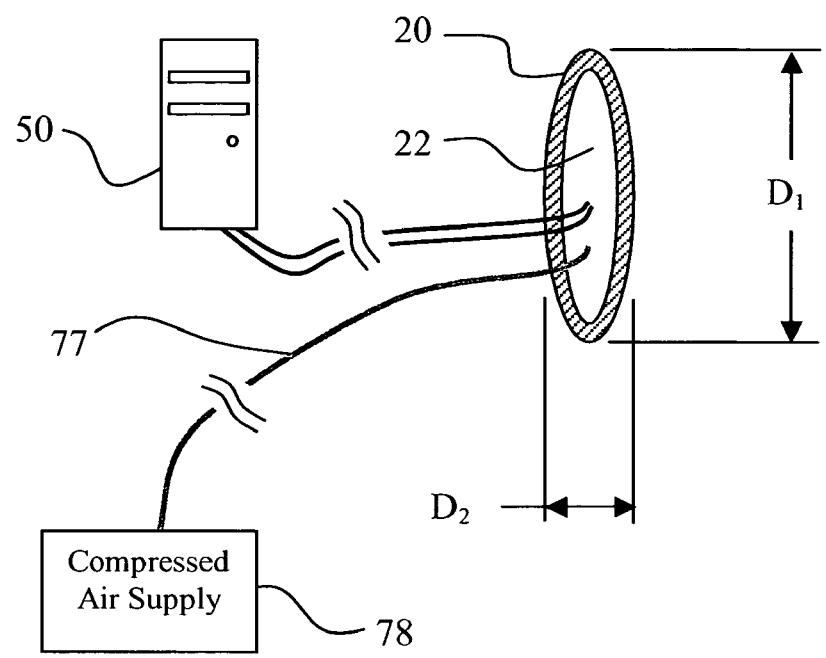
FIG. 3 is a cross-sectional view of an embodiment of a pivotal beam of an apparatus for measuring water-flow noise.

FIG. 2 illustrates an embodiment of the beam 20, wherein beam 20 has a hydrodynamic drag reducing shape and a hollow core 22. The hydrodynamic drag reducing shape may be any shape with a relatively smooth, streamlined surface such as a hydrofoil. A suitable hydrodynamic drag reducing shape, by way of example, for beam 20 may be an aircraft strut with an elliptical cross section, as shown in FIG. 3, with a major diameter $D_1$ of about 3 inches and a minor diameter $D_2$ of about 1 inch. FIG. 2 also shows signal wires 33 routed through the hollow core 22 of beam 20. The signal wires 33 are disposed to carry water-flow noise data 35, generated by the hydrophone 30, as shown in FIG. 11, to the computer 50 for storage and/or processing. Routing the signal wires 33 through the hollow core 22 of beam 20 allows beam 20 to pivot through water without creating any additional noise-producing turbulence due to exposed wires. The beam 20 may be made of any material that is capable of resisting anything more than insignificant deformation in the presence of hydrodynamic flow-induced stress. For example, beam 20 may be made of aluminum, wood, steel, plastic, or a fiber/resin composite, to name a few.

FIG. 2 also illustrates how beam 20 may be comprised of a plurality of segments $S_1$-$S_n$ coupled to each other, where n may be any positive integer. The length $L_1$ of the beam 20 as well as the distance $R_1$ between the hydrophone 30 and the pivotal axis 25 may therefore be altered by controlling the number of segments $S_1$-$S_n$ comprising beam 20. For example, a segment may be added or removed to increase or decrease respectively the length $L_1$ of the beam 20; and the hydrophone 30 may be mounted between any two of segments $S_1$-$S_n$, thus altering the distance $R_1$ between the hydrophone 30 and the pivotal axis 25. Adjustments to the distance $R_1$ between the hydrophone 30 and the pivotal axis 25 may be used to adjust the speed of the hydrophone through the water. The greater the distance $R_1$ the faster the effective flow rate of water over the hydrophone 30. The lengths $1_1$-$1_n$ of each of the segments $S_1$-$S_n$ may be any desired length. By way of example, five feet may be a suitable dimension for each of lengths $1_n$-$1_n$.

Figure 4:
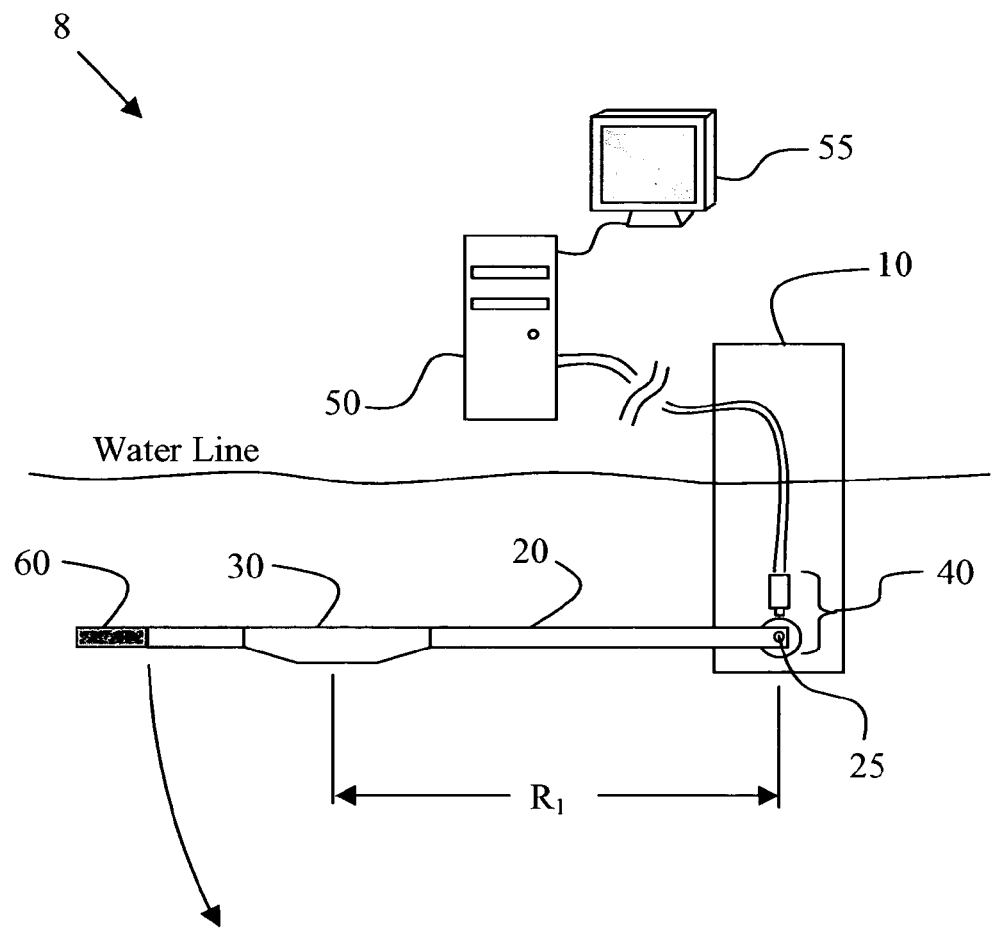
FIG. 4 is a front view of an embodiment showing an attached weight.

FIG. 4 shows a weight 60 operably coupled to the distal end 29 of beam 20. Unlike free-falling objects of differing masses in a vacuum environment that fall at the same rate, objects of similar volume and of differing masses will sink in water at differing rates due to the effect of buoyant and drag forces. Adding weight 60 to the distal end 29 serves to increase the free-fall speed of descent of beam 20 as it pivots through the water about pivotal axis 25. The weight 60 may be made of any material with a density greater than that of the beam 20. The mass of the weight 60 may be altered depending on the desired tangential velocity v of hydrophone 30. As a general, free-fall rule, the greater the mass of weight 60, the greater the tangential velocity v of hydrophone 30 up to a terminal velocity of beam 20. Also, the weight 60 may have a hydrodynamic-drag-reducing shape such that weight 60 generates a minimal amount of noise-causing turbulence. By way of example, one embodiment of weight 60 involves filling of beam segment $S_n$ at the distal end 29 with a desired amount of lead.

Figure 5A:
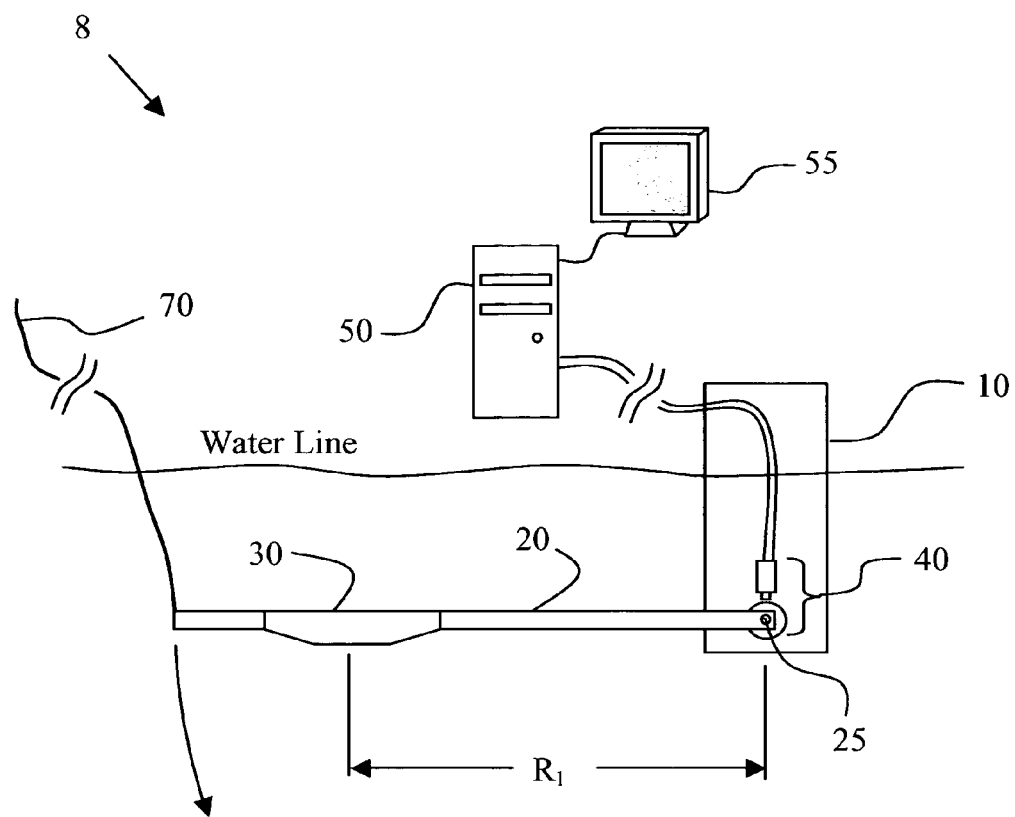
FIG. 5a is a front view of an embodiment of a beam retriever.
Figure 5B:
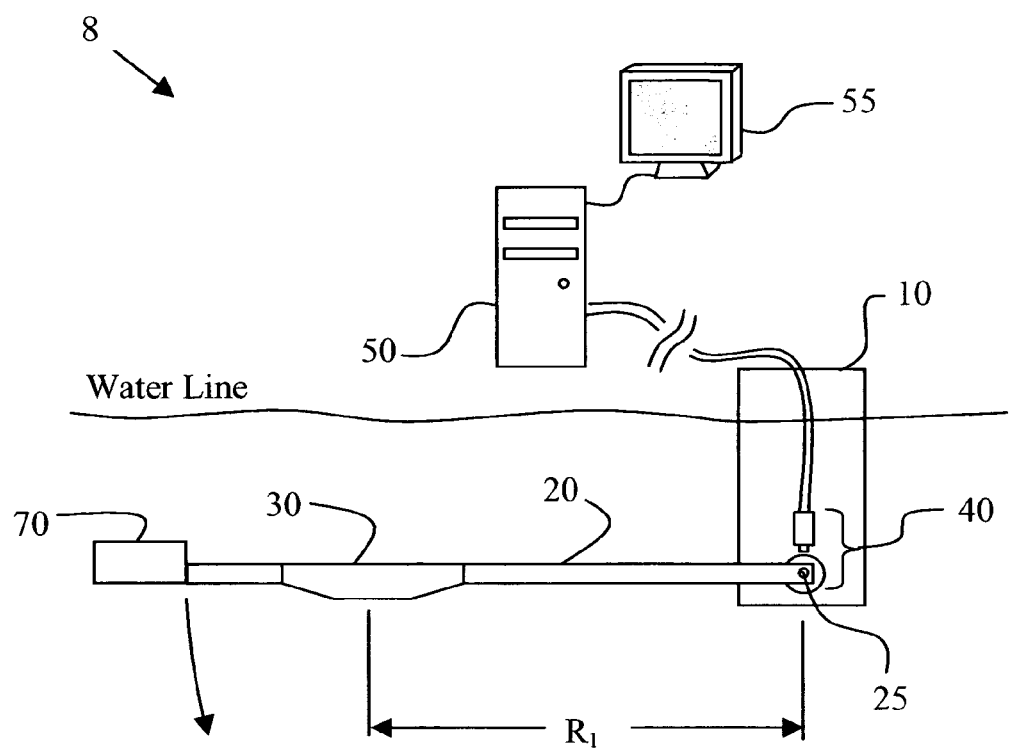
FIG. 5b is a front view of another embodiment of a beam retriever.

FIG. 5a illustrates another embodiment of a water-flow noise measuring apparatus 8 further comprising a beam retriever 70, which is operably coupled to the distal end 29. The beam retriever 70 may be a line of sufficient strength to allow a user to pull beam 20 up towards the waterline such as a nylon rope. In another embodiment, as shown in FIG. 5b, the beam retriever 70 may be a buoy operably coupled to the distal end 29. As a buoy, the beam retriever 70 may be inflatable and/or have a shape that minimizes the amount of hydrodynamic drag created as the beam retriever 70 moves through the water such as a hydrofoil. If the beam retriever 70 is inflatable, an air inflation line 77 may be routed through hollow core 22 to a compressed air supply 78, as shown in FIG. 3.

Figures 6A, 6B:
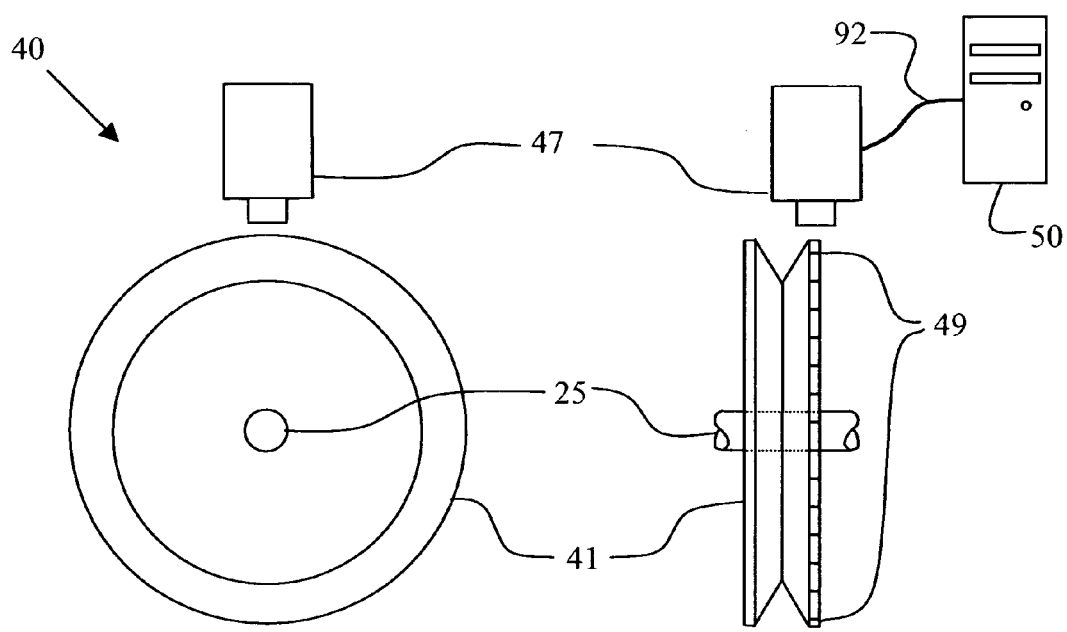
FIG. 6a is a front view of an embodiment of an angular displacement sensor.
FIG. 6b is a side view of another embodiment of an angular displacement sensor.

The angular displacement sensor 40, operably coupled to the proximal end 21 of the beam 20 and the frame 10, is capable of providing displacement detection signals 45 to computer 50, as shown in FIG. 11, from which the computer 50 may determine the angular speed to of the beam 20 with respect to the frame 10. In one embodiment, the angular displacement sensor 40 may be a non-contact optical sensor capable of optically detecting the angular displacement of the beam 20 as it pivots about pivotal axis 25 without physically contacting beam 20. By way of example, FIGS. 6a-6b illustrate an embodiment of the angular displacement sensor 40, comprising a first sheave 41, which may have y optical pick-up points 49 circumferentially positioned on an outer edge of first sheave 41, as shown in FIG. 6b, where y may be any positive integer. The first sheave 41 may be mechanically coupled to beam 20 via pivotal axis 25 such that the angular displacement of beam 20 and first sheave 41 may be about equal. The embodiment shown in FIG. 6a also shows an optical sensor 47 disposed to detect an optical pick-up point 49 and generate a displacement detection signal 45 for each optical pick-up point detected. Displacement detection signals 45 may then be received by the computer 50 via transmission line 92. The transmission line 92 need not be a physical line but may be a wireless connection. Every displacement detection signal 45 received by the computer 50 in a given time interval $\Delta t$ may be counted by the computer 50. For the embodiment shown in FIGS. 6a-6b, the angular speed $\omega$ of beam 20 may be calculated according to the equation:

$$\omega = (2 * \pi * x)/(y * \Delta t)$$

Where $\pi$ is the well-known constant representing the ratio of a circle's circumference to its diameter, or 3.14159265 . . . ; $\Delta t$ equals a given time interval in seconds; x equals the number of displacement detection signals 45 received by the computer 50 in the time interval $\Delta t$; and y equals the total number of optical pick-up points 49 on the first sheave 41. Although the embodiment of the angular displacement sensor 40 shown in FIGS. 6a and 6b includes optical pick-up points 49 on a first sheave 41, it is to be understood that the optical pick-up points 49 may be on any structure, made of any material, that is capable of presenting the optical pick-up points 49 to the optical sensor 47 such that optical sensor 47 may detect the optical pick-up points 49 as the structure rotates about the pivotal axis 25.

Figure 7A:
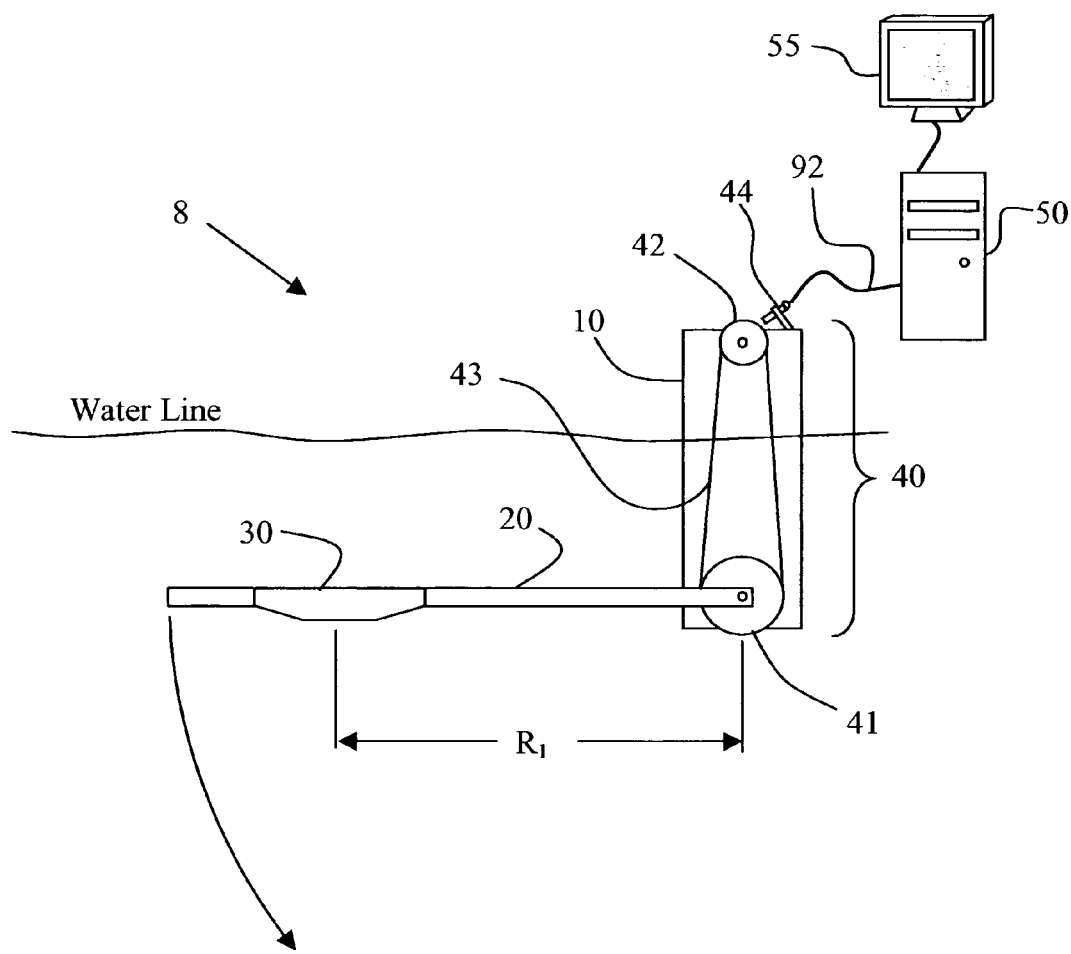
FIG. 7a is a front view of another embodiment of an angular displacement sensor.
Figure 7B:
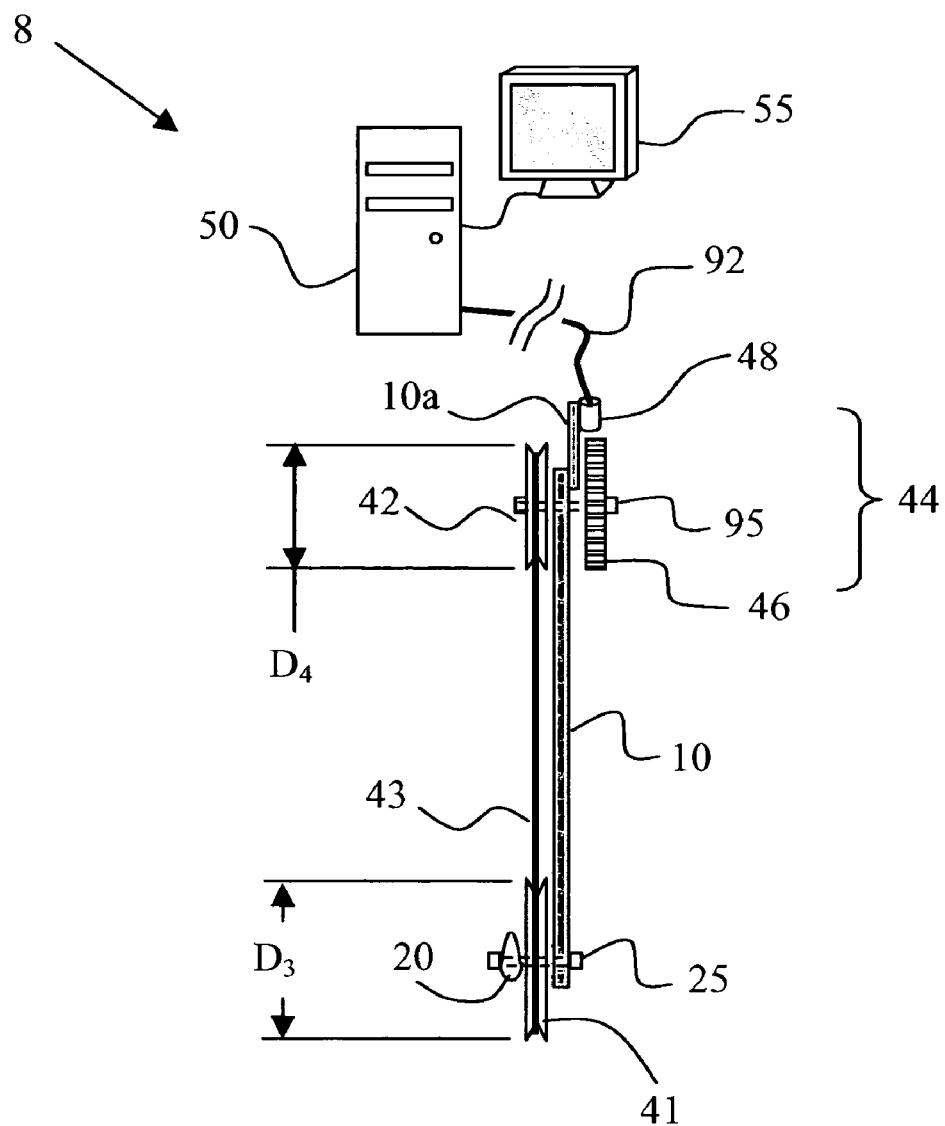
FIG. 7b is a side view of another embodiment of an angular displacement sensor.
Figure 7C:
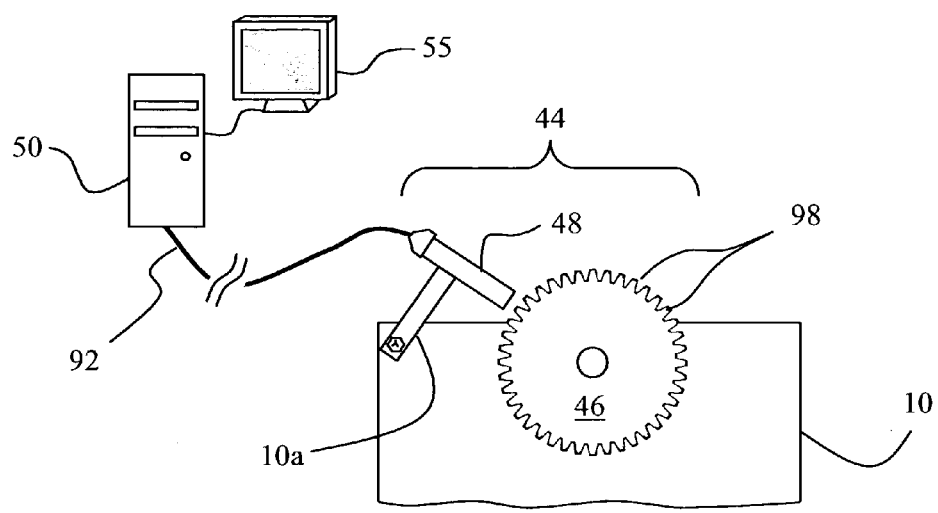
FIG. 7c is a rear view of an embodiment of a counter assembly.

FIGS. 7a-7c are depictions of another embodiment of the angular displacement sensor 40 comprising a first sheave 41 having a diameter $D_3$, a second sheave 42 having a diameter $D_4$, a belt 43, and a counter assembly 44. The first sheave 41 may be mechanically connected to the proximal end 21 of beam 20 such that the first sheave 41 may have the same angular speed X as beam 20. As shown in FIG. 7a, the second sheave 42 may be rotatably connected to frame 10, and mechanically coupled to the first sheave 41 by the belt 43. As beam 20 and the first sheave 41 rotate through the water, the rotational motion is transferred to the second sheave 42 via belt 43. The counter assembly 44 may comprise a toothed gear 46 and a gear-tooth counter 48, as shown in FIGS. 7b and 7c. In one embodiment, the toothed gear 46, having m teeth 98, may be operably coupled to the second sheave 42 as shown in FIGS. 7b and 7c such that rotational motion of the second sheave 42 may be translated to toothed gear 46 via a connecting shaft 95. The gear-tooth counter 48 may be connected to frame 10 by adjustable fixture 10a. The gear-tooth counter 48 may be positioned such that the gear-tooth counter 48 may count the teeth 98 of gear 46 as gear 46 rotates. By way of example, the first sheave 41 may have a diameter $D_3$ of about 15 inches, the second sheave 42 may have a diameter $D_4$ of about 3 inches, the belt 43 may be a round rubber belt, the toothed gear 46 may have 60 teeth 98, and the gear-tooth counter 48 may be a magnetic proximity sensor capable of detecting each gear tooth 98 as it passes the gear-tooth counter 48, as shown in FIG. 7c. The gear tooth counter 48 may be capable of generating a gear tooth detection signal for every gear tooth 98 detected. Each gear tooth detection signal, transmitted to the computer 50 via transmission line 92, may be counted by the computer 50. For the embodiment shown in FIGS. 7a-7c, the angular speed $\omega$ of beam 20 may be calculated according to the equation:

$$\omega = (\pi * x * D_4)/(2 * m * \Delta t * D_3)$$

Where $\pi$ is the well-known constant representing the ratio of a circle's circumference to its diameter, or 3.14159265 . . . ; $\Delta t$ equals a given time interval in seconds; x equals the number of gear tooth detection signals received by computer 50 the time interval Δt; m equals the total number of teeth 98 in gear 46; $D_3$ is the diameter of the first sheave 41; and $D_4$ is the diameter of the second sheave 42.

Figure 8:
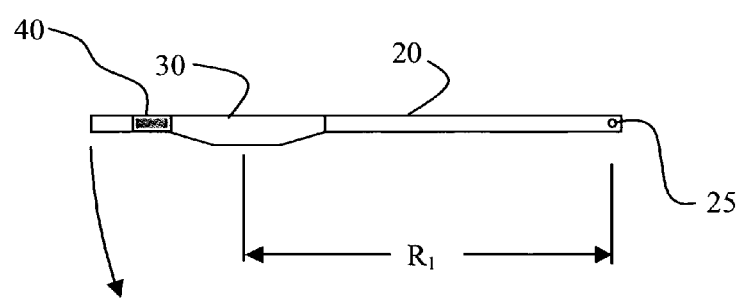
FIG. 8 is a front view of another embodiment of an angular displacement sensor.

FIG. 8 shows another embodiment of the angular displacement sensor 40, wherein the angular displacement sensor 40 may be a Doppler current measuring device located near the hydrophone 30, capable of directly measuring the flow rate of the water flowing past the sensor. The Doppler current measuring device may also have a shape that reduces hydrodynamic drag. The angular displacement sensor 40 is not limited to the embodiments described above but may be any comparable device that may be used to determine the angular speed ω of beam 20 and/or the effective flow rate of water over hydrophone 30.

Figure 9:
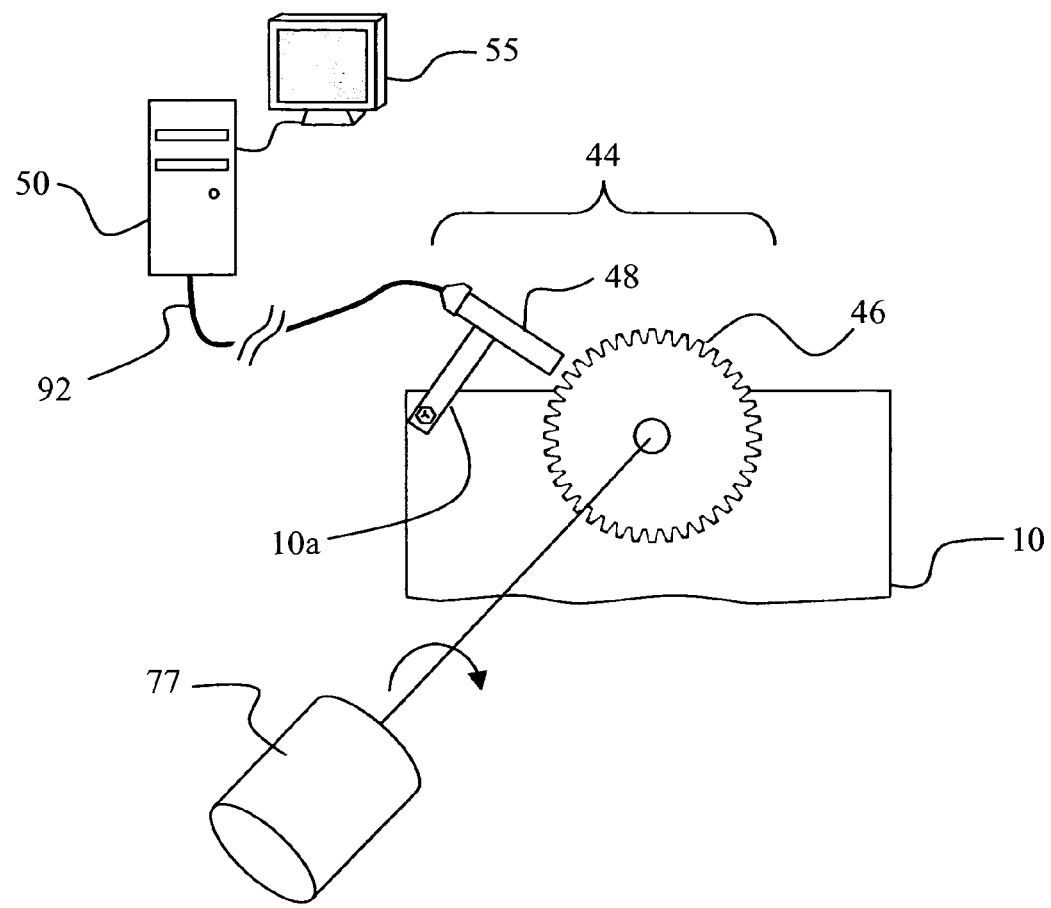
FIG. 9 is a rear view of another embodiment of a beam retriever.

FIG. 9 depicts another embodiment of beam retriever 70, wherein the toothed gear 46 may be turned manually or by a motor 77 to aid in the retrieval of beam 20 from the equilibrium position. In the embodiment depicted in FIG. 9, the rotation of the toothed gear 46 counterclockwise may serve to move beam 20 back towards the water line. Rotating toothed gear 46 counterclockwise may serve to increase the angular speed ω of beam 20 thus achieving tangential velocities greater than could be achieved by permitting beam 20 to pivot freely through the water about pivotal axis 25.

While the hydrophone 30, coupled to beam 20, pivots through the water at various speeds, water-flow noise data 35 generated by the hydrophone 30 and displacement detection signals 45 generated by the angular displacement sensor 40 may be collected and stored by the computer 50. The computer 50 may then determine the tangential velocity v of the hydrophone 30, which is about equal to the flow rate of water over the hydrophone 30. The water-flow noise data 35 and the tangential velocity v may be used by the computer 50 to generate an output signal 52 representing the water flow noise data 35 as a function of the tangential velocity v, as shown in FIG. 11. The output signal 52 may then be plotted on display 55. Although the output signal 52 is shown in FIG. 11 as being transmitted from the computer 50, it is to be understood that the output signal 52 may be transmitted to a display, and/or used internally as an input to another function performed by the computer 50.

Figure 10:
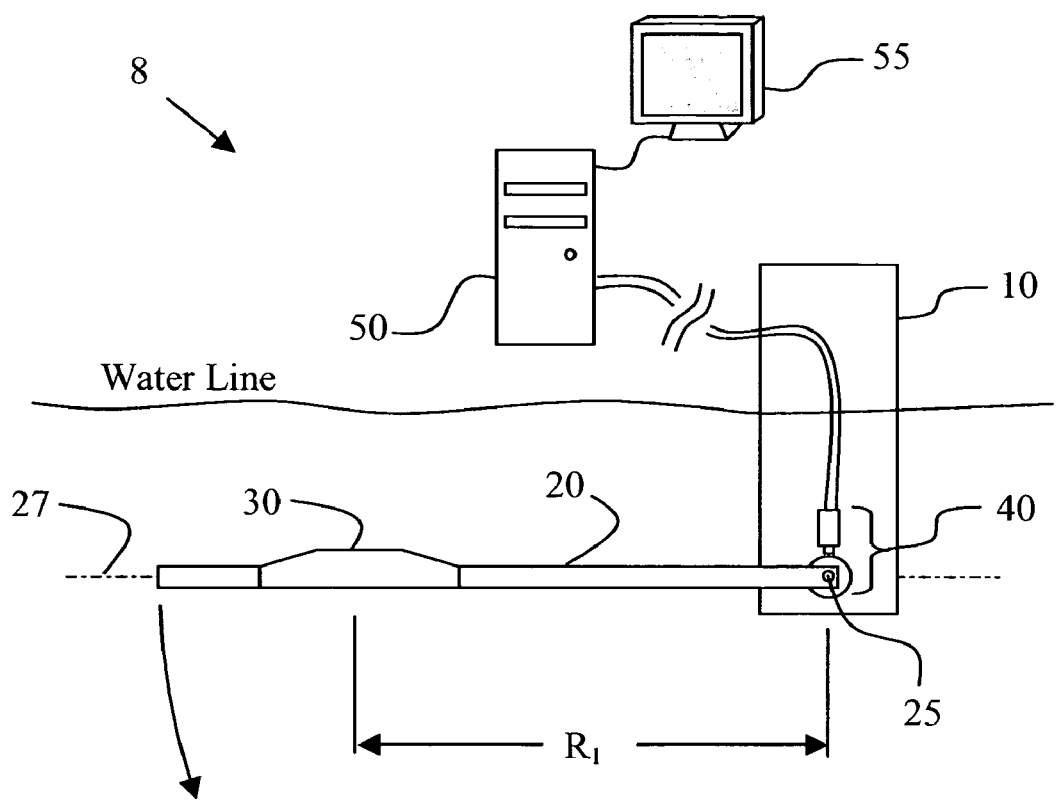
FIG. 10 is a front view of another embodiment of an apparatus for measuring water-flow noise.

FIG. 10 illustrates an alternative embodiment of the water-flow noise measuring apparatus, wherein the orientation of the hydrophone 30 with respect to the water flow is variable. For example, FIG. 10 shows the hydrophone 30 rotated 180° about a long axis 27 from the orientation of the hydrophone 30 shown in FIG. 1a. Different orientations of the hydrophone 30 with respect to the water flow may be accomplished by positioning the hydrophone 30 to any desired orientation with respect to beam 20.

From the above description apparatus for measuring water-flow noise, it is manifest that various techniques can be used for implementing the concepts of the apparatus without departing from its scope. Moreover, while apparatus for measuring water-flow noise has been described with specific reference to certain embodiments, a person of ordinary skill in the art would recognize that changes may be made in form and detail without departing from the spirit and the scope of the apparatus. The described embodiments are to be considered in all respects as illustrative and not restrictive. It should also be understood that the apparatus for measuring water-flow noise is not limited to the particular embodiments described herein, but is capable of many rearrangements, modifications, and substitutions without departing from the scope of the apparatus.

I claim:

1. A water flow noise measuring apparatus comprising:
a frame;
a beam comprising a distal and a proximal end, said proximal end pivotably coupled to said frame;
a hydrophone coupled to said beam at a predetermined distance from said proximal end, said hydrophone being capable of detecting said water flow noise and generating water flow noise data;
an angular displacement sensor operably coupled to said beam and said frame, said angular displacement sensor being capable of detecting the angular displacement of said beam with respect to said frame and generating a displacement detection signal; and
a computer capable of receiving said water flow noise data and said displacement detection signal, determining the tangential velocity of said hydrophone from said displacement detection signal, and generating an output signal representing said water flow noise data as a function of said tangential velocity.

2. The apparatus of claim 1, wherein said beam has a reduced drag shape.

3. The apparatus of claim 2, wherein said beam is elliptical.

4. The apparatus of claim 2, wherein the orientation of said hydrophone with respect to said water flow is variable.

5. The apparatus of claim 2, wherein said beam further comprises a hollow core.

6. The apparatus of claim 5, further comprising signal wires operably coupled to said hydrophone and routed through said hollow core.

7. The apparatus of claim 6, wherein said beam is aluminum.

8. The apparatus of claim 1, wherein the length of said beam is variable.

9. The apparatus of claim 1, further comprising a weight coupled to said distal end.

10. The apparatus of claim 9, wherein said weight has a drag reducing shape.

11. The apparatus of claim 1, further comprising a beam retriever operably coupled to said distal end of said beam, capable of moving said beam towards an interface of said water with an atmosphere.

12. The apparatus of claim 11, wherein said beam retrieval means comprises a nylon rope.

13. The apparatus of claim 11, wherein said beam retriever comprises an inflatable buoy.

14. The apparatus of claim 13, wherein said buoy has a drag reducing shape.

15. The apparatus of claim 2, wherein said angular displacement sensor comprises:
a first sheave mechanically coupled to said proximal end;
a second sheave operably coupled to said first sheave and rotatably connected to said frame; and
a counter operably coupled to said second sheave.

16. The apparatus of claim 15, wherein the counter comprises:
a toothed gear mechanically coupled to said second sheave; and
a magnetic gear-tooth counting sensor, capable of counting the teeth of said toothed gear upon the rotation of said toothed gear.

* * * * *